(12) United States Patent
Ishiwata et al.

(10) Patent No.: US 8,837,125 B2
(45) Date of Patent: Sep. 16, 2014

(54) ELECTRIC APPARATUS

(75) Inventors: Nobuyoshi Ishiwata, Kanagawa (JP);
Nobuyuki Takahashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/607,943

(22) Filed: Sep. 10, 2012

(65) Prior Publication Data

US 2013/0063879 A1    Mar. 14, 2013

(30) Foreign Application Priority Data

Sep. 13, 2011  (JP) ................. 2011-199861

(51) Int. Cl.
| | |
|---|---|
| H05K 5/00 | (2006.01) |
| H05K 7/00 | (2006.01) |
| G11B 33/02 | (2006.01) |
| A47G 1/10 | (2006.01) |
| A47B 96/06 | (2006.01) |
| E05C 5/02 | (2006.01) |
| G06F 1/16 | (2006.01) |

(52) U.S. Cl.
CPC .................... *G06F 1/1632* (2013.01)
USPC ............ 361/679.01; 361/679.02; 361/679.33; 361/679.34; 361/679.35; 361/679.57; 361/679.58; 361/679.59; 248/316.5; 248/292.14; 248/229.22; 74/142

(58) Field of Classification Search
CPC ..... G06F 1/16; G06F 1/33225; H05K 5/0026; H05K 5/026; H05K 2201/10159
USPC ............ 361/679.01–679.45, 679.55–679.59, 361/679.01–679.09, 679.1–679.19, 361/679.31–679.45, 679.55–679.6, 361/724–747; 369/30.93–30.98; 455/95–100, 344–350; 248/80–88, 248/155.1–155.5, 166–173, 180.1–186.2, 248/229.1–231.51, 271.4, 292.14, 248/316.1–316.8; 74/141–169, 380–387; 292/1–62, 113, 169.11–169.23, 292/341.11–341.19
See application file for complete search history.

(56) References Cited

U.S. PATENT DOCUMENTS 5,882,220 A * 3/1999 Horii et al. ................ 439/297
7,360,964 B2   4/2008 Tsuya
(Continued)

FOREIGN PATENT DOCUMENTS

| JP | 51114902 U | 9/1976 |
|---|---|---|
| JP | 53-045856 U | 4/1978 |

(Continued)

OTHER PUBLICATIONS

Office Action for Japanese Patent Application No. 2011-199861, dated on Jul. 23, 2013.

(Continued)

*Primary Examiner* — Jerry Wu
(74) *Attorney, Agent, or Firm* — Matthew B. Dernier, Esq.; Gibson & Dernier LLP

(57) ABSTRACT

A support arm has an attachment hole formed thereon. The support arm has a first side wall and a second side wall both constituting edge of the attachment hole. An engaged convex portion is formed on the second side wall. The first side wall restricts a hook of the front panel from moving in a direction away from the second side wall toward the first wall. The first side wall is elastically deformable such that it swells in the direction.

20 Claims, 6 Drawing Sheets

(56) References Cited

U.S. PATENT DOCUMENTS

| | | |
|---|---|---|
| 2005/0054229 A1 | 3/2005 | Tsuya |
| 2011/0103002 A1* | 5/2011 | Slaby et al. .............. 361/679.41 |

FOREIGN PATENT DOCUMENTS

| | | |
|---|---|---|
| JP | 55179093 U | 12/1980 |
| JP | 62182584 U | 11/1987 |
| JP | 04-072689 U | 6/1992 |
| JP | 04077015 U | 7/1992 |
| JP | 06002754 U | 1/1994 |
| JP | 06125182 A | 5/1994 |
| JP | 2001085068 A | 3/2001 |
| JP | 2001217566 A * | 8/2001 |
| JP | 2005098496 A | 4/2005 |
| JP | 2007-335330 A | 12/2007 |
| JP | 2010255802 A | 11/2010 |
| JP | 2011042327 A | 3/2011 |
| JP | 2012247037 A | 12/2012 |

OTHER PUBLICATIONS

Office Action for Japanese Patent Application No. 2011-199861, dated on Feb. 25, 2014.

Office Action for Chinese Patent Application No. 2012103379631, dated on May 8, 2014.

* cited by examiner

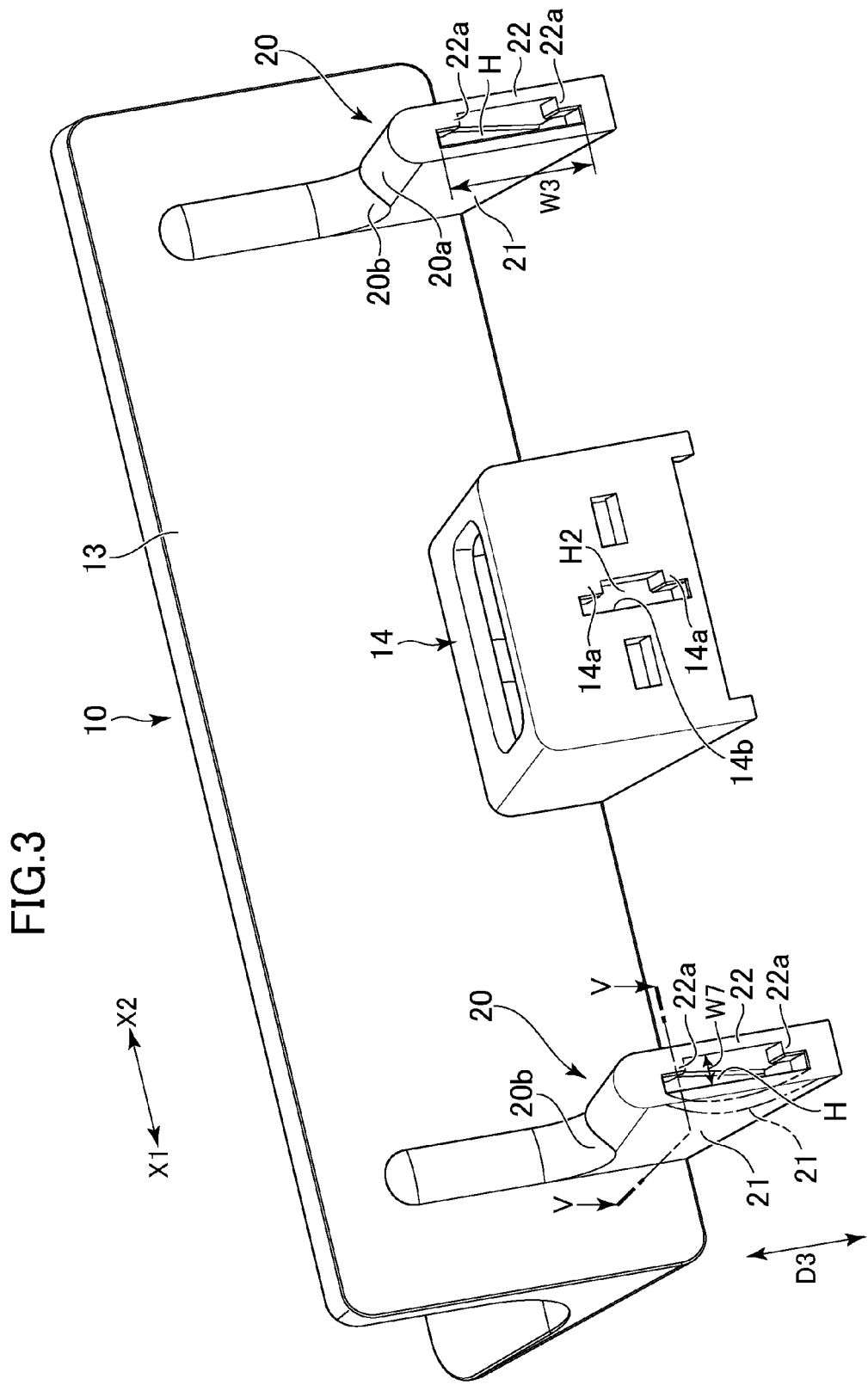

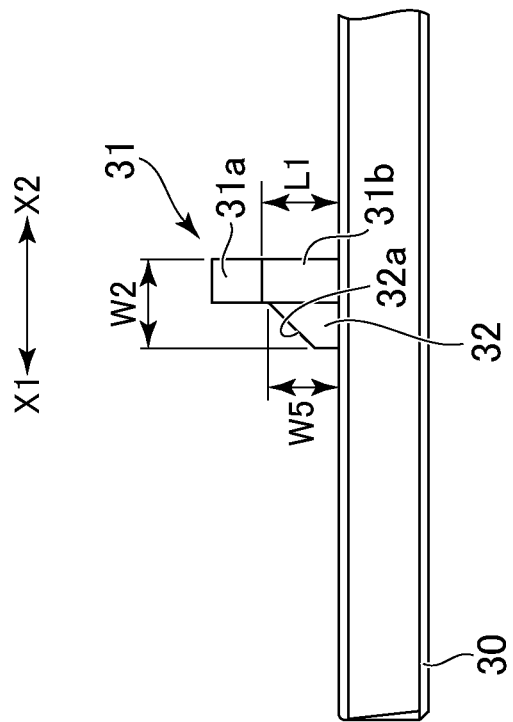

ELECTRIC APPARATUS

BACKGROUND OF THE INVENTION

1. Field of the Invention

The present invention relates to an assembling structure for members constituting an electric apparatus.

2. Description of the Related Art

Conventionally, hooks is utilized in various electric apparatuses in order to assemble two external appearance members (e.g., a housing) together that constitute an external appearance thereof (e.g., Japanese Patent Laid-open Publication No. 2007-335330). An arm-like hook is formed on one external appearance member, and hooked on a convex or concave portion formed on the other external appearance member. The hooking restricts separation of the two external appearance members.

The above hook needs to be elastically deformable and temporarily deformed in assembling process of the two external appearance members. For example, in a structure in which a convex portion is formed on the other external appearance member, the prong portion of the hook needs to climb over the convex portion by utilizing elastic deformation of the hook in the assembling process.

SUMMARY OF THE INVENTION

In the above described conventional structure, elastic deformation is necessary in the assembling process, and thus increase of rigidity (strength) of the hook is limited. Therefore, in some cases, it is difficult to increase the assembly strength of two external appearance members. In particular, in a case in which the number of hooks is limited due to the shape and/or size of an external appearance member, increase of assembly strength is difficult.

An electric apparatus according to one aspect of the prevent invention includes a first member having an attachment hole formed thereon; and a second member having a hook formed thereon for insertion into the attachment hole. The first member includes a first portion and a second portion constituting an edge of the attachment hole and being opposite to each other, and an engaged portion formed on the second portion, for the hook to be hooked. The first portion restricts, in a state where the hook is hooked on the engaged portion, the hook from moving in a first direction that is a direction from the second portion toward the first direction. Further, the first portion is elastically deformable such that it swells in the first direction to allow insertion of the hook into the attachment hole.

According to the above described electric apparatus, elastic deformations of the hook and the engaged portion are not required, so that it is possible to enhance rigidity thereof. As a result, assembly strength of the two members can be improved.

BRIEF DESCRIPTION OF THE DRAWINGS

FIG. 3 is a perspective view of a housing that constitutes the cradle;

FIGS. 4A and 4B show major elements of a front panel attached on the housing, in which FIG. 4A is a side view and FIG. 4B is a plan view;

DETAILED DESCRIPTION OF THE INVENTION

Figure 1:
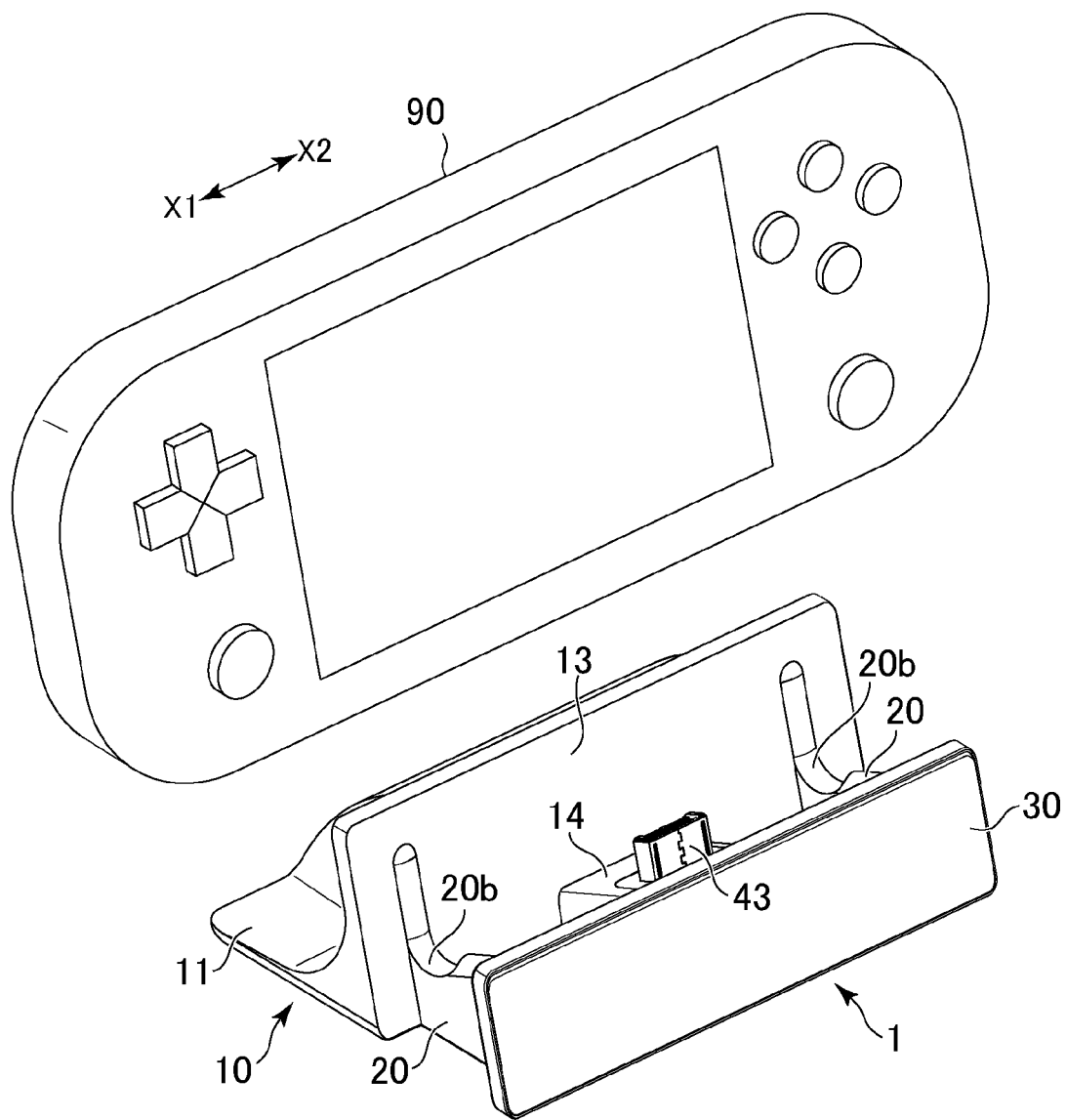
FIG. 1 is a perspective view of a cradle, which is an electric apparatus according to an embodiment of the present invention.
Figure 2:
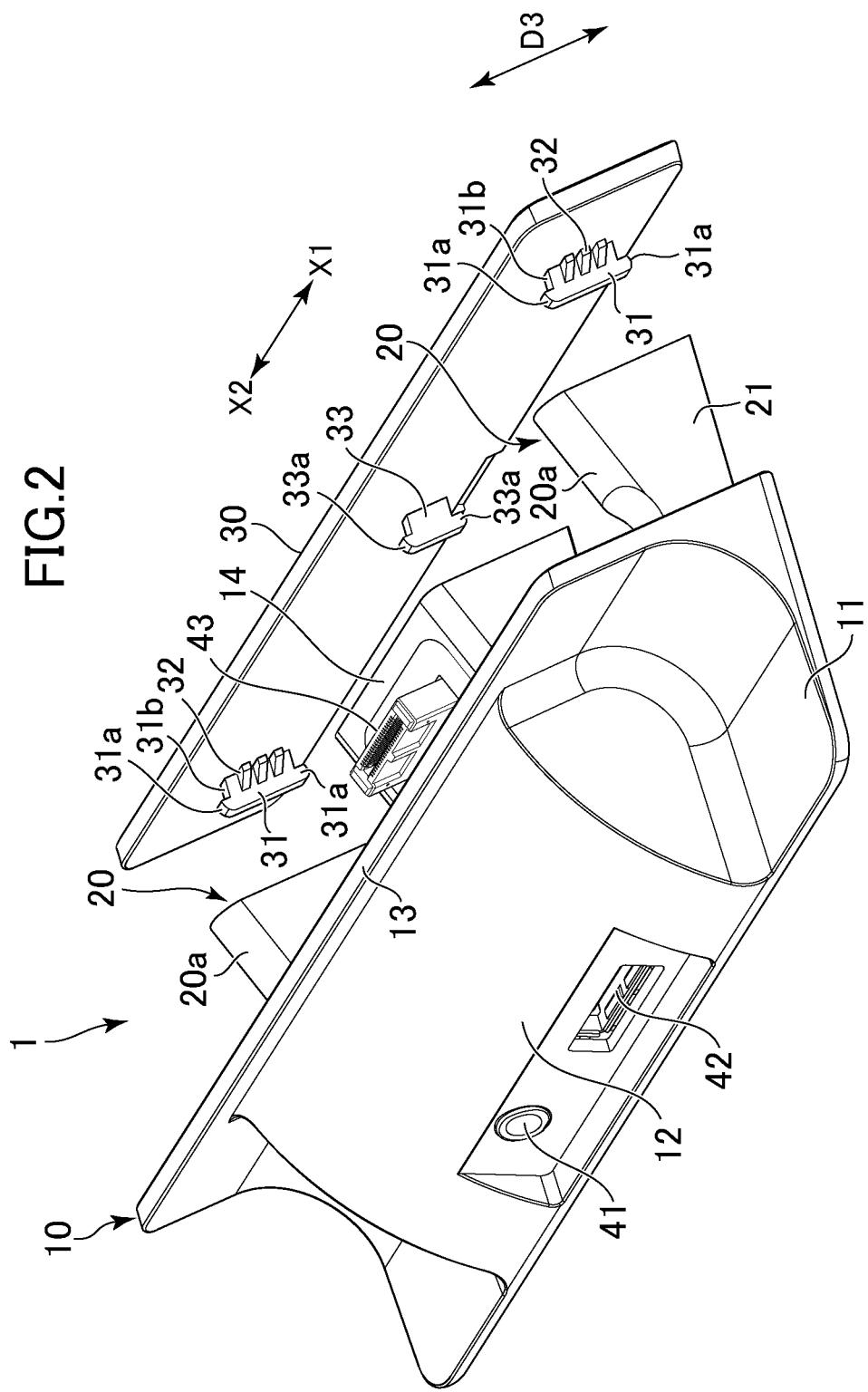
FIG. 2 is an exploded perspective view of the cradle, showing a rear side of the cradle.

In the following, an embodiment of the present invention will be described with reference to the accompanying drawings. FIG. 1 is a perspective view of an electric apparatus according to one embodiment of the present invention. In FIG. 1, a cradle 1 for supporting a portable electronic apparatus 90 is shown as the electric apparatus. FIG. 2 is an exploded perspective view of the cradle 1, showing a rear side of the cradle 1.

The electronic apparatus 90 is, e.g., a game apparatus, a motion picture reproducing apparatus, an apparatus for functioning as a communication apparatus. The cradle 1 is an apparatus for supporting the electronic apparatus 90. The cradle 1 is used in charging the electronic apparatus 90 and data exchange between the electronic apparatus 90 and another electronic apparatus. As shown in FIGS. 1 and 2, the cradle 1 includes, as components constituting the external appearance thereof, a housing (first external appearance member) 10 and a front panel (second external appearance member) 30 attached to the housing 10.

The housing 10 stores a circuit substrate. The housing 10 in this example includes a box portion 12 for storing a circuit board, as shown in FIG. 2. The box portion 12 further stores connectors 41, 42 to which a charge cable and a data transmission cable are connected. Openings for exposing the connectors 41, 42 are formed on the back surface of the box portion 12. The housing 10 includes a panel-like base portion 11 that constitutes a base of the box portion 12. The base portion 11 includes a width in the lateral direction (the X1-X2 direction) larger than that of the box portion 12. The housing 10 includes a front wall portion 13 that constitutes the front side of the box portion 12. In using the cradle 1, the electronic apparatus 90 is placed along the front wall portion 13. The front wall portion 13 is formed inclined rearward so as to support the portable electronic apparatus 90 standing on a slant. The width in the lateral direction of the front wall portion 13 is substantially equal to that of the base portion 11.

The housing 10 includes a support arm 20 extending forward from the front wall portion 13. In use, the cradle 1 supports an electronic apparatus 90 placed on the support arm 20. The housing 10 in this example has two support arms 20 positioned apart from each other in the left-right direction. This can improve stability in supporting the portable electronic apparatus 90. The upper surface 20a of the support arm 20 includes a cross section having an arc shape swelling upward. The upper surface 20a can limits a size of a portion of the lower surface of the electronic apparatus 90 where the support arm 20 abuts. The upper surface 20a extends diagonally forward and upward so as to support the electronic apparatus 90 on a slant rearward.

The cradle 1 includes a connector 43 provided on the lower surface of the electronic apparatus 90 between the two support arms 20. In this example, the housing 10 includes a substantially box-like connector holding portion 14 that projects forward from the front wall portion 13. The connector 43 projects upward from the connector holding portion 14. The connector 43 is positioned substantially perpendicular to the upper surface of the connector holding portion 14. It is possible to stably support the electronic apparatus 90 by the connector holding portion 14 while the connector 43 is kept connected to the electronic apparatus 90.

The support arm 20 is positioned apart from the connector holding portion 14 with a space formed therebetween. By utilizing the space, it is possible to use the electronic apparatus 90 placed on the cradle 1. For example, in a case where a connector for a headphone jack or the like is formed on the lower surface of the electronic apparatus 90 besides a connector to which the connector 43 is fit, a cable plague inserted into the connector of the electronic apparatus 90 can be located in the space. A concave portion 20b is formed on the upper surface 20a of the support arm 20, as shown in FIG. 1. A cable connected to the connector of the electronic apparatus 90 can be extracted to the outside of the space via the concave portion 20b.

For the housing 10 in this example, the box portion 12, the base portion 11, the front wall portion 13, the support arm 20, and the connector holding portion 14 are integrally made of resin. However, these may not be necessarily formed integral. For example, the support arm 20 may be formed separate from the box portion 12 and the front wall portion 13.

As described above, the cradle 1 includes a front panel 30 attached to the housing 10. The front panel 30 in this example is attached to the support arm 20. The front panel 30 connects the front ends of the two support arms 20 together, which can increase the strength of the support arm 20. Further, the front panel 30 in this example is also attached to the connector holding portion 14, as to be described later, which can increase the strength of the connector holding portion 14.

Figure 5A:
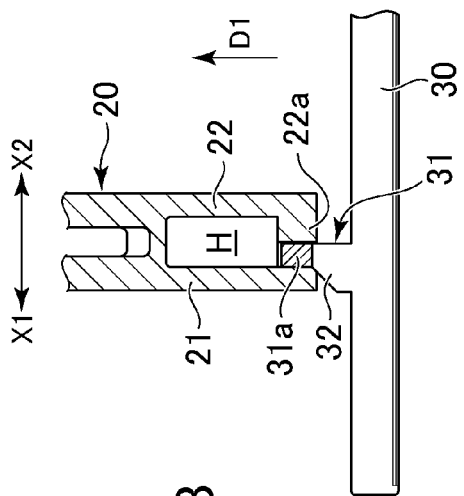
FIGS. 5A-5D are cross sectional views along the line V-V shown in FIG. 3, showing a process of assembling a cradle into the housing.
Figure 5B:
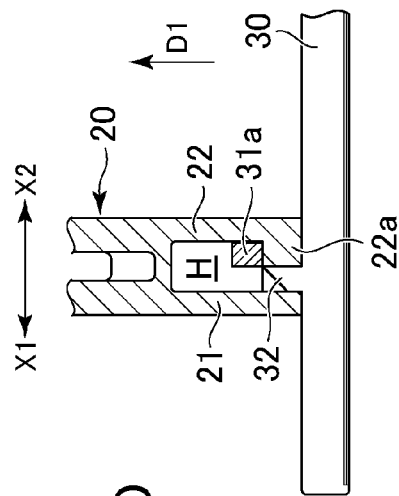
Figure 5C:
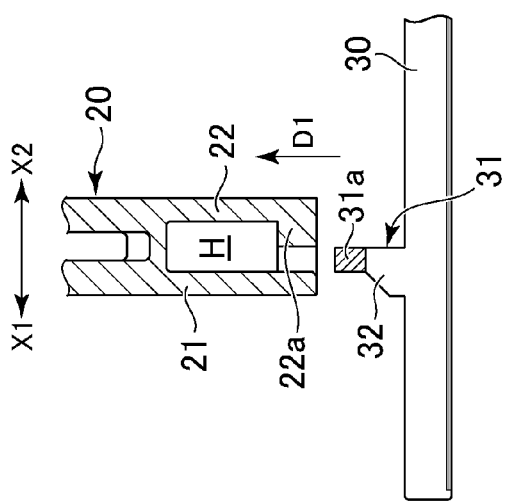
Figure 5D:
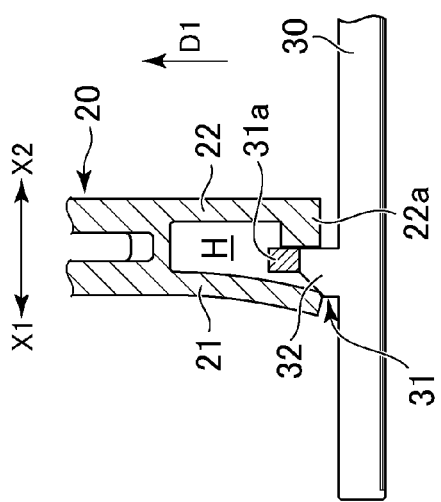

Hereinafter, an assembly structure for the housing 10 and the front panel 30 will be described. FIG. 3 is a perspective view of the housing 10. FIGS. 4A and 4B show the front panel 30. In particular, FIG. 4A is a side view, and FIG. 4B is a plan view. FIGS. 5A-5D are cross sectional views for explaining movements of the respective parts in assembling the front panel 30. Each of the cross sections in FIGS. 5A-5D corresponds to the line V-V in FIG. 3. FIG. 5A shows a state before a hook 31, to be described later, is inserted into an attachment hole H. FIG. 5B shows a state in which only the tip end of the hook 31 is inserted into the attachment hole H. FIG. 5C shows a state in which a part of a rib 32, to be described later, is inserted in the attachment hole H. FIG. 5D shows a state in which the hook 31 is fully inserted in the attachment hole H.

As shown in FIG. 2, a hook 31 is formed on the front panel 30. In particular, the hook 31 is formed projecting from the front panel 30 toward the housing 10, to be more precise, toward the support arm 20. As shown in FIG. 3, an attachment hole H is formed on the support arm 20 that is open toward the front panel 30. The hook 31 is inserted into the attachment hole H. The attachment hole H functions as a holder for holding the hook 31. Each support arm 20 includes a first side wall (first portion) 21 and a second side wall (second portion) 22 that are opposite to each other in the left-right direction. The attachment hole H is formed between the first side wall 21 and the second side wall 22, so that the side walls 21, 22 define the edge of the attachment hole H. That is, the side walls 21, 22 function as side walls of the holder for holding the hook 31.

The support arm 20 includes an engaged convex portion 22a formed on the edge of the attachment hole H and projecting toward inside the attachment hole H. The hook 31 is hooked on the engaged convex portion 22a (see FIG. 5D). That is, an engaging projection 31a is formed on an end portion of the hook 31 (see FIGS. 4A AND 4B), and is hooked on the engaged convex portion 22a. This prevents the hook 31 from being removed from the attachment hole H.

As shown in FIG. 3, the engaged convex portion 22a is formed on the second side wall 22 side. That is, the engaged convex portion 22a is positioned away from the first side wall 21 toward the second side wall 22. The support arm 20 in this example includes two engaged convex portions 22a. One of the engaged convex portions 22a is formed at a corner defined by the front edge of the second side wall 22 and the upper edge of the attachment hole H, while the other engaged convex portion 22a is formed at a corner defined by the front edge of the second side wall 22 and the lower edge of the attachment hole H. The arrangement that the engaged convex portion 22a is formed on the corner can increase the strength of the engaged convex portion 22a. The engaged convex portion 22a is formed on the edge of the attachment hole H, and thus the inlet of the attachment hole (holder) H is narrowed. In this example, as described above, the two engaged convex portions 22a are respectively formed at the corners of the attachment hole H positioned toward the second side wall 22. Therefore, the inlet of the attachment hole H has a narrowed vertical width in its area toward the second side wall 22. Further, the inlet of the attachment hole H has narrowed lateral widths in the uppermost and lowermost thereof.

In a state where the hook 31 remains hooked on the engaged convex portion 22a, as shown in FIG. 5D, the first side wall 21 restricts the hook 31 from moving in a direction from the second side wall 22 toward the first side wall 21. In this example, the distance between the first side wall 21 and the second side wall 22, that is, the lateral width W7 of the attachment hole H in an area between the upper engaged convex portion 22a and the lower engaged convex portion 22a (the width in the X1-X2 direction in FIG. 3) corresponds to the maximum lateral width W2 (see FIG. 4B) of a portion of the hook 31 that is to be inserted in the attachment hole H. In detail, the lateral width W7 of the attachment hole H is equal to the maximum lateral width W2 of the hook 31. With this structure, when the hook 31 is at the engaged position shown in FIG. 5D, the first side wall 21 abuts on the side surface (left side surface) of the hook 31 (the engaged position refers to the position of the hook 31 when the engaging projection 31a of the hook 31 is hooked on the engaged convex portion 22a). This restricts the hook 31 from moving in the direction away from the second side wall 22, that is, movement of the hook 31 for cancelling hooking between the engaging projection 31a and the engaged convex portion 22a. The hook 31 in this example includes a rib 32, to be described later, and has the maximum lateral width W2 at the portion provided with the rib 32. The first side wall 21 abuts on the rib 32 when the hook 31 is positioned at the engaged position.

In a process where the hook 31 is inserted into the attachment hole H, interference between the engaged convex portion 22a and the engaging projection 31a needs to be avoided. The engaged convex portion 22a is formed on the second side wall 22, as described above. Therefore, the position of the hook 31 in the above insertion process (FIGS. 5B and 5C) is offset from the engaged position in the direction away from the second side wall 22 toward the first side wall 21 (FIG. 5D).

As shown in FIG. 5C, the first side wall 21 is elastically deformable such that it swells in the direction away from the second side wall 2, namely, the leftward direction X1 in this example (the front edge of the first side wall 21 being elastically deformed is indicated by the two dot chain line in FIG. 3). The deformation allows the hook 31 at the above offset position to be inserted into the attachment hole H. The vertical width W3 (FIG. 2) in an area of the attachment hole H closer to the first side wall 21 and the thickness of the first side wall 21 are set such that the first side wall 21 can elastically deform. [The vertical width W3 refers to a width in the direction D3 (in FIG. 2, hereinafter referred to as a vertical direction). A direction D1 indicated in FIGS. 5A-5D is a direction in which the hook 31 is inserted into the attachment hole H (hereinafter referred to as an insertion direction). A direction X1 indicated in FIGS. 5A-5D is a direction away from the second side wall 22 toward the first side wall 21 (hereinafter referred to as an elastically deformation direction). The vertical direction D3 is perpendicular to both of the insertion direction D1 and the deformation direction D2.] By the first side wall 21 having such a structure, elastic deformation of the hook 31 and that of the engaged convex portion 22a are unnecessary in assembling the front panel 30 and the housing 10, it is allowed to increase a rigidity (assembly strength) thereof. This consequently can increase assembly strength of the front panel 30 and the housing 10. The first side wall 21 is directed in the elastically deformable direction X1, that is, has a perpendicular along the elastically deformable direction X1. Therefore, elastic deformation of the first side wall 21 can be readily caused.

Further, with the above structure, it is possible to reduce the length of the hook 31 in the insertion direction D1 and the depth of the attachment hole H in the insertion direction D1 because an elastic deformation of the hook 31 is unnecessary. Further, the distance between the first side wall 21 and the second side wall 22, that is, the lateral width W7 of the attachment hole H, can also be made smaller. Consequently, size reduction of the assembly structure, thinning of the support arm 20, and shortening of the length of the support arm 20 can be achieved. Still further, because the thickness of the first side wall 21 is so defined that allows its elastic deformation, the thickness of the first side wall 21 is resulted in small. Consequently, the support arm 20 can be made thinner. In this example, the thickness of the first side wall 21 is thinner than that of the second side wall 22.

The hook 31 has a portion pressing the first side wall 21 such that the first side wall 21 swells in the direction away from the second side wall 22 toward the first side wall 21. Specifically, as shown in FIG. 4B, the hook 31 includes a wall-like main portion 31b that projects from the front panel 30. In addition, the hook 31 includes a rib (convex portion) 32 formed on a side surface (on the left side surface in this example) of the hook main portion 31b and projecting toward the first side wall 21. The first side wall 21 is positioned on the left side of the hook main portion 31b, and the hook 31 presses the front edge of the first side wall 21 that constitutes an inlet of the attachment hole H through the rib 32 in the process where the hook 31 is inserted into the attachment hole H (see FIG. 5C).

The rib 32 has a vertical width W4 smaller than the vertical width W6 of the hook main portion 31b (the vertical widths W4, W6 here refer to the width in the vertical direction D3 perpendicular to both of the insertion direction D1 and the elastically deformable direction X1 of the first side wall 21). The rib 32 concentrates the press force from the hook 31 on a part of the first side wall 21, thus the elastic deformation of the first side wall 21 can be readily caused. The rib 32 in this example is formed such that it abuts on a middle portion of the first side wall 21 in the vertical direction D3. With the above, elastic deformation of the first side wall 21 can be more readily caused. The rib 32 in this example is formed on a middle portion of the hook main portion 31b in the vertical direction D3.

The rib 32 in this example includes a plurality of (three in this example) small ribs 32b that are positioned apart from each other in the vertical direction D3, as shown in FIG. 4A. This can reduce the entire volume of the rib 32. Consequently, it is possible to prevent the front surface of the front panel 30 from being bent due to shrinkage of the material of the front panel 30 in formation process of the front panel 30. In the description here, the vertical width of the all small ribs 32b is defined as the vertical width W4.

As shown in FIG. 4A, the hook 31 has the maximum lateral width W2 at the portion provided with the rib 32. As described above, the distance between the first side wall 21 and the second side wall 22, that is, the lateral width W7 of the attachment hole H between the two engaged convex portions 22a, corresponds to the width W2. Therefore, when the hook 31 is positioned at the engaged position, the first side wall 21 abuts on the rib 32 (see FIG. 5D).

As shown in FIGS. 4A AND 4B, the rib 32 is formed on the basal of the hook 31. This can increase the strength of the hook 31, and thus can further increase the assembly strength of the housing 10 and the front panel 30. The rib 32 is formed on a corner between a side surface of the hook main portion 31b and the rear surface of the front panel 30.

The rib 32 is formed only on the basal of the hook main portion 31b but not on an end portion of the hook main portion 31b. Thus, the length W5 of the rib 32 in the insertion direction D1 (FIG. 4B) is shorter than the length of the hook main portion 31b in the insertion direction D1. Therefore, compared to a structure in which the rib 32 has the same length as that of the hook main portion 31b, the elastic deformation of the first side wall 21 which caused in the process of insertion of the hook 31 can be reduce. This consequently facilitates insertion of the hook 31 into the attachment hole H, and can reduce the strength required to the first side wall 21.

As shown in FIG. 4A, the rib 32 includes a slope 32a formed on a part thereof facing the first side wall 21. The slope 32a is formed diagonal relative to the insertion direction D1. Thus, the slope 32a diagonally hits on the front edge of the first side wall 21 in the insertion process of the hook 31 into the attachment hole H. This consequently facilitates insertion of the hook 31 into the attachment hole H.

As described above, the hook 31 has an engaging projection 31a formed on an end portion thereof. As shown in FIG. 4A, the engaging projection 31a projects in the vertical direction D3. This structure reduces the lateral width of the hook 31, compared to a structure in which the engaging projection 31a projects from the hook 31 toward the second side wall 22, that is, a structure in which the engaging projection 31a projects in the direction indicated by X2. Consequently, the lateral width W7 of the attachment hole H can be reduced.

The engaging projection 31a projects in the vertical direction D3, and the rib 32 projects from the side surface of the hook main portion 31b in the elastically deformable direction X1 that is perpendicular to the vertical direction D3. That is, the engaging projection 31a and the rib 32 project from the hook main portion 31b in two directions perpendicular to the insertion direction D. This makes it possible to press the first side wall 21 by the rib 32 without pressing the first side wall 21 by the engaging projection 31a.

As shown in FIG. 4A, the hook 31 in this example has two engaging projections 31a, which project in the opposite directions from each other. That is, one of the engaging projections 31a projects upward, while the other projects downward. This structure can further increase the assembly strength of the housing 10 and the front panel 30. For example, even when a moment to bring up the lower edge of the front panel 30 and a moment to bring down the upper edge of the front panel 30 is applied to the front panel 30, the moment can be resisted by either one of the engaging projections 31a. As described above, the two engaged convex portions 22a formed on the support arm 20 are formed respectively on the corner defined by the front edge of the second side wall 22 and the upper edge of the attachment hole H and on the corner defined by the front edge of the second side wall 22 and the lower edge of the attachment hole H (see FIG. 3). Then, the distance between the two engaged convex portions 22a, that is, the distance between the lower edge of the upper engaged convex portion 22a and the upper edge of the lower engaged convex portion 22a is smaller than the vertical width of the hook 31 at a part where the engaging projection 31a is formed, that is, the distance between the upper end of the upper engaging projection 31a and the lower end of the lower engaging projection 31a. Therefore, the two engaging projections 31a are respectively hooked on the two engaged convex portions 22a.

The vertical width W6 of the hook main portion 31b in the vertical direction D3 is sufficiently large, compared to the thickness of the hook main portion 31b, that is, the width of the hook main portion 31b in the lateral direction. Therefore, even when the above described moment is applied, deformation of the hook 31 itself can be prevented.

As described above, the position of the hook 31 in the insertion process (FIG. 5B) of the hook 31 into the attachment hole H is offset from the second side wall 22 than the engaged position of the hook 31 (FIG. 5D). As shown in FIG. 5C, the hook 31 is inserted into the attachment hole H while pressing the first side wall 21 in the elastically deformable direction X1 via the rib 32. After that, the hook 31 is forced to shift toward the second side wall 22 by the elastic force of the first side wall 21 at a time when the engaging projection 31a has passed beyond the position of the engaged convex portion 22a in the insertion direction. That is, the hook 31 moves in a direction opposite from the elastically deformable direction X1 and reaches the engaged position shown in FIG. 5D. The maximum lateral width W2 of the hook 31 corresponds to the lateral width W7 of the attachment hole H, as described above, so that the first side wall 21 returns to its original shape when the hook 31 reaches the engaged position.

As described above, the housing 10 has two support arms 20. The front panel 30 has two hooks 31 corresponding to the two support arms 20. The first side walls 21 of the two support arms 20 are positioned in the same direction relative to the respective hooks 31. In this example, the left side walls of the two support arms 20 function as the first side walls 21. The rib 32 is positioned on the same side relative to the two hooks 31. In this example, the ribs 32 are both formed on the left side surfaces of the respective hook main portions 31b. Therefore, in the insertion process of the two hooks 31 into the respective attachment holes H, the front panel 30 entirely moves in the rightward direction. Neither of the two hooks 31 requires elastic deformation.

As shown in FIG. 5D, when the hook 31 is at the engaged position, the front panel 30 abuts on the front edge of the first side wall 21 and that of the second side wall 22. In detail, the distance L1 from the rear surface of the front panel 30 to the engaging projection 31a (FIG. 4B) corresponds to the width of the engaged convex portion 22a in the insertion direction D1. That is, the distance L1 is equal to the width of the engaged convex portion 22a in the insertion direction D1. With the above, the front edge of the first side wall 21 is covered by the front panel 30 once the hook 31 is inserted into the attachment hole H1. As a result, the first side wall 21 can be reliably prevented from being elastically deformed again.

As shown in FIG. 2, the front panel 30 additionally has a middle hook 33 between the two hooks 31. The middle hook 33 as well includes two engaging projections 33a. Similar to the engaging projection 31a, the engaging projections 33a project in a direction perpendicular to both of the insertion direction D1 and the elastically deformable direction X1, that is, upward and downward, respectively. Meanwhile, an attachment hole H2 for accepting the middle hook 33 is formed on the front surface of the connector holding portion 14 of the housing 10. An engaged convex portion 14a for the engaging projection 31a to be hooked is formed on the edge of the attachment hole H2.

The thickness of the middle hook 33 (the width in the left-right direction) is smaller than the lateral width of the attachment hole H2. Specifically, the thickness of the middle hook 33 corresponds to the interval between the engaged convex portion 14a and an opposed wall portion 14b. No rib corresponding to the above described rib 32 is formed on the middle hook 33, so that the middle hook 33 can be inserted into the attachment hole H2 without forcing the edge of the attachment hole H2 to be enlarged. Then, when the above described front panel 30 shifts in a direction opposite from the elastically deformable direction X1, the middle hook 33 is hooked on the engaged convex portion 14a.

As described above, the engaged convex portion 22a is formed on the second side wall 22. The first side wall 21 restricts, in a state where the hook 31 is hooked on the engaged convex portion 22a, the hook 31 from moving in a direction X1 away from the second side wall 22 toward the first side wall 21. Further, the first side wall 21 is elastically deformable such that it swells in the direction X1. Therefore, elastic deformations of the hook 31 and the engaged convex portion 22a are not necessary in assembling, and thus it is possible to design for increased strength (rigidity) of the hook 31 and engaged convex portion 22a. Consequently, assembly strength of the housing 10 and the front panel 30 can be improved.

Further, the rib 32 is formed on the side surface of the hook 31, and the hook 31 presses the first side wall 21 via the rib 32 in the insertion process of the hook 31 into the attachment hole H. The rib 32 has a smaller width in the vertical direction D3 perpendicular to the insertion direction D1 and the elastically deformable direction X1 of the first side wall 21 than that of the hook main portion 31b. This structure enables the press force of the hook 31 to concentrate on a part of the first side wall 21, and thus elastic deformation of the first side wall 21 can be readily caused.

Two attachment holes H are formed on the housing 10, and the front panel 30 includes two hooks 31. Further, the first side walls 21 of the two attachment holes H are positioned in the same direction relative to the two hooks 31. With this structure, neither of the two hooks 31 requires elastic deformation.

The rib 32 is formed so as to press a middle portion of the first side wall 21 in the vertical direction D3. With this structure, elastic deformation of the first side wall 21 can be more readily caused.

Further, the rib 32 formed on the hook 31 can enhance the strength of the hook 31.

The hook 31 includes the rib 32 formed on the basal thereof. Therefore, it is possible to reduce the elastic deformation of the first side wall 21 that is caused in the insertion process of the hook 31 into the attachment hole H. This consequently facilitates insertion of the hook 31 into the attachment hole H.

The hook 31 has an engaging projection 31a formed on an end portion thereof. The engaging projection 31a projects in the vertical direction D3 that is perpendicular to both of the insertion direction D1 and the elastically deformable direction X1 of the first side wall 21. This structure can reduce the lateral width of the hook main portion 31b. Consequently, it is possible to reduce the lateral width W7 of the attachment hole H.

The hook 31 includes two engaging projections 31a that project in opposite directions from each other. This structure can prevent separation of the front panel 30 from the housing 10 even when a moment is occur to the front panel 30.

The housing 10 has two support arms 20 positioned apart from each other, and the front panel 30 is attached to the two support arms 20. This structure can increase the strength of the support arms 20, while reducing the weight of the housing 10.

Further, the connector 43 is positioned between the two support arms 20. This structure can improve stability in supporting a portable electronic apparatus 90.

Note that the present invention is not limited to the cradle 1, and various modifications are possible.

For example, the present invention is not limited to a cradle, and may be applied to any other electric apparatus, an information processing apparatus, such as, e.g., a game apparatus, a personal computer, or the like, an AV apparatus, or a camera. Further, the present invention may be applied to a peripheral apparatus of an information processing apparatus, such as a battery pack, an adaptor or the like.

The front panel 30 may be attached to the main body of the housing 10, rather than the support arm 20.

Although the rib 32 in the cradle 1 is formed on the hook 31, the rib 32 may be formed on the inside surface of the first side wall 21.

Figure 6:
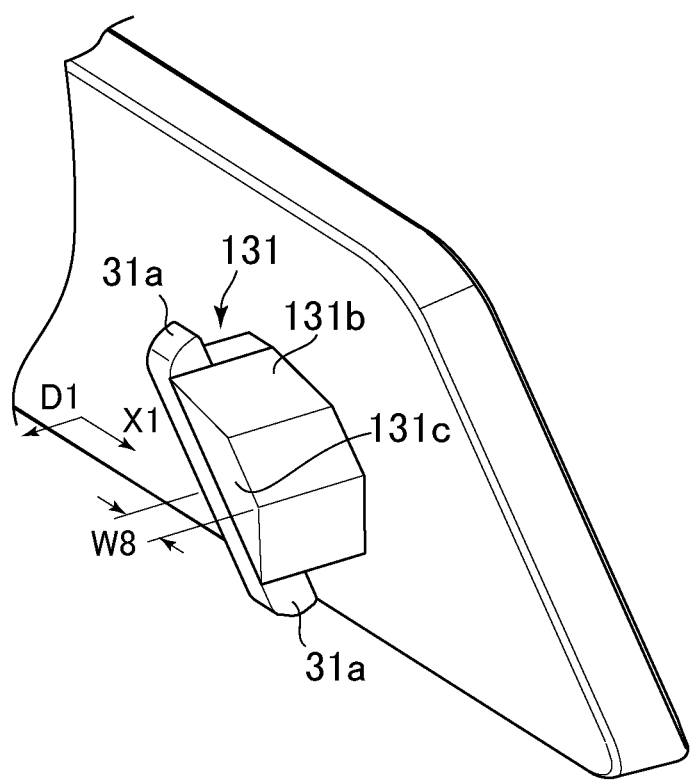
FIG. 6 is a perspective view showing a modified example of a hook.

Further, the rib 32 may not be necessarily provided. In this case, the first side wall 21 may be forced to deform by the side surface of the hook main portion 31b. Further, the hook 31 may be formed as shown in, e.g., FIG. 6. The hook 131 shown in FIG. 6 includes a hook main body 131b and an engaging projection 31a. The lateral width of the hook main body 131b, that is, the maximum lateral width W8 in the left-right direction, is substantially same as the maximum lateral width of the hook 31 including the rib 32. That is, the lateral width W8 of the hook main body 131b corresponds to the lateral width W7 of the attachment hole H in an area between the two engaged convex portions 22a. In the example shown in FIG. 6, the hook main portion 31b is formed such that its vertical width becomes gradually smaller in the elastically deformable direction X1. This formation of the hook main portion 31b enables a large force to be applied to a middle portion of the first side wall 21 in the vertical direction. Further, the hook main body 131b includes, on the front surface thereof, a slope 131c diagonal relative to the insertion direction D1. This facilitates insertion of the hook 131 into the attachment hole H because the hook main body 131b diagonally hits the edge of the first side wall 21.

Further, the engaging projection 31a may project from the hook main portion 31b toward the second side wall 22 rather than in the up-down direction. In this case, the hook 31 may not have the rib 32. Further, in this case, the distance between the engaged convex portion 22a and the first side wall 21, that is, the lateral width of the inlet of the attachment hole H in a portion thereof other than a portion where the engaged convex portion 22a is formed may be smaller than the maximum lateral width of the hook 31, that is, the lateral width of the hook 31 including the engaging projection 31a. With this structure, it is possible to forcibly deform the first side wall 21 by the hook main portion 31b.

What is claimed is:

1. An electric apparatus, comprising:
a first member having an attachment hole formed thereon;
a second member having a hook formed thereon for insertion into the attachment hole,
a first portion and a second portion constituting an edge of the attachment hole of the first member and being opposite to each other,
a convex portion is formed on either one of an inside surface of the first portion of the first member and a side surface of the hook, and
an engaged portion formed on the second portion, for the hook to be hooked, wherein:
the hook presses the first portion via the convex portion in an insertion process of the hook into the attachment hole,
the first portion restricts, in a state where the hook is hooked on the engaged portion, the hook from moving in a first direction that is a direction from the second portion toward the first portion, the hook is inserted into the attachment hole in a second direction, the convex portion has a smaller width in a third direction perpendicular to both of the first direction and the second direction than that of the hook, and
the first portion is elastically deformable such that it swells in the first direction to allow insertion of the hook into the attachment hole.

2. The electric apparatus according to claim 1, wherein the first member has two attachment holes each of which functions as the attachment hole, the second member has two hooks each of which functions as the hook, and first portions of the two attachment holes are positioned in a same direction relative to the two hooks.

3. The electric apparatus according to claim 1, wherein the convex portion is so formed as to press a middle portion of the first portion in the third direction.

4. The electric apparatus according to claim 1, wherein the convex portion is formed on the hook.

5. The electric apparatus according to claim 3, wherein the convex portion is formed on a basal of the hook.

6. The electric apparatus according to claim 1, wherein the hook includes, on an end portion thereof, a projection to be hooked on the engaged portion, and the hook is inserted into the attachment hole in the second direction, the projection projects in a third direction that is perpendicular to both of the first direction and the second direction.

7. The electric apparatus according to claim 6, wherein the hook includes two projections each of which functions as the projection, and the two projections project in opposite directions from each other.

8. The electric apparatus according to claim 1, wherein the electric apparatus is a cradle including, in the first member, a support portion for supporting a portable electronic apparatus.

9. The electric apparatus according to claim 8, wherein the first member includes, as the support portion, two support portions positioned apart from each other, and the second member is attached on the two support portions.

10. The electric apparatus according to claim 9, further comprising a connector provided between the two support portions.

11. An electric apparatus, comprising:
a first member having an attachment hole formed thereon,
a second member having a hook formed thereon for insertion into the attachment hole,
a first portion and a second portion constituting an edge of the attachment hole of the first member and being opposite to each other,
an engaged portion formed on the second portion, for the hook to be hooked,
a projection disposed on an end portion of the hook for hooking on the engaged portion, wherein:
the first portion restricts, in a state where the hook is hooked on the engaged portion, the hook from moving in a first direction that is a direction from the second portion toward the first portion, the first portion is elastically deformable such that it swells in the first direction to allow insertion of the hook into the attachment hole, and the hook is inserted into the attachment hole in a second direction, the projection projects in a third direction that is perpendicular to both of the first direction and the second direction.

12. The electric apparatus according to claim 11, wherein:

a convex portion is formed on either one of an inside surface of the first portion of the first member and a side surface of the hook, the hook presses the first portion via the convex portion in an insertion process of the hook into the attachment hole, and the hook is inserted into the attachment hole in the second direction, the convex portion has a smaller width in a third direction perpendicular to both of the first direction and the second direction than that of the hook.

13. The electric apparatus according to claim 11, wherein the first member has two attachment holes each of which functions as the attachment hole, the second member has two hooks each of which functions as the hook, and first portions of the two attachment holes are positioned in a same direction relative to the two hooks.

14. The electric apparatus according to claim 12, wherein the convex portion is so formed as to press a middle portion of the first portion in the third direction.

15. The electric apparatus according to claim 12, wherein the convex portion is formed on the hook.

16. The electric apparatus according to claim 14, wherein the convex portion is formed on a basal of the hook.

17. The electric apparatus according to claim 11, wherein the hook includes two projections each of which functions as the projection, and the two projections project in opposite directions from each other.

18. The electric apparatus according to claim 11, wherein the electric apparatus is a cradle including, in the first member, a support portion for supporting a portable electronic apparatus.

19. The electric apparatus according to claim 18, wherein the first member includes, as the support portion, two support portions positioned apart from each other, and the second member is attached on the two support portions.

20. The electric apparatus according to claim 19, further comprising a connector provided between the two support portions.

* * * * *